United States Patent

Paquin et al.

Patent Number: 5,104,356
Date of Patent: Apr. 14, 1992

[54] TORSION DAMPER, IN PARTICULAR OF A DAMPED DOUBLE FLYWHEEL FOR AN AUTOMOTIVE VEHICLE

[75] Inventors: Jacques Paquin, Villeneuve-La-Garenne; Jacky Naudin, Ermont, both of France

[73] Assignee: Valeo, Paris, France

[21] Appl. No.: 490,449

[22] Filed: Mar. 8, 1990

[30] Foreign Application Priority Data

Mar. 17, 1989 [FR] France ............................ 89 03545

[51] Int. Cl.$^5$ .............................................. F16D 3/14
[52] U.S. Cl. ............................... 464/60; 192/106.1
[58] Field of Search ........................ 192/106.1, 106.2; 464/57–59, 64–68; 74/574

[56] References Cited

U.S. PATENT DOCUMENTS

| 3,387,505 | 6/1968 | Rumsey | 74/574 |
|---|---|---|---|
| 4,181,208 | 1/1980 | Davis | 192/106.1 |
| 4,496,036 | 1/1985 | Loizeau | 192/106.2 |
| 4,724,719 | 2/1988 | Werner et al. | 464/68 X |
| 4,760,754 | 8/1988 | Friedmann | 464/68 X |
| 4,782,936 | 11/1988 | Bopp | 192/106.2 |
| 4,795,012 | 1/1989 | Durum | 192/106.1 X |
| 4,874,074 | 10/1989 | Damon et al. | 192/106.2 |

FOREIGN PATENT DOCUMENTS

2499182 6/1982 France.
2571461 4/1986 France.

Primary Examiner—Lenard A. Footland
Assistant Examiner—William G. Battista, Jr.
Attorney, Agent, or Firm—Longacre & White

[57] ABSTRACT

This present invention is concerned with torsion dampers of the kind comprising two coaxial parts which are mounted for rotation with respect to each other against the action of circumferentially acting resilient means in the form of at least one spiral spring comprising a resiliently deformable arm with an inner carrier element and an outer carrier element, one of which is connected through a profiled coupling with one of the rotatable coaxial parts of the damper, for rotation with it.

The other (second) carrier element is coupled with the other coaxial damper part (the second coaxial part) through a gripping action, the second coaxial part being subjected to the action of an axially acting spring element which is engaged axially on the second coaxial part and which urges the second carrier element towards a radial thrust surface formed on the second coaxial part, so as to make contact, directly or indirectly, with the thrust surface.

The invention is especially applicable to a damper of a damped double flywheel for an automotive vehicle.

8 Claims, 5 Drawing Sheets

TORSION DAMPER, IN PARTICULAR OF A DAMPED DOUBLE FLYWHEEL FOR AN AUTOMOTIVE VEHICLE

FIELD OF THE INVENTION

The present invention relates to torsion damping devices, in particular for double flywheels for automotive vehicles, of the kind comprising at least two coaxial parts which are mounted for rotation of one with respect to the other within the limits of a predetermined angular displacement and against the action of circumferentially acting resilient means comprising at least one resiliently deformable arm and two carrier elements, namely an inner carrier element and an outer carrier element, between which the arm extends and with at least one of which it is integrally joined through a junction zone, one of the carrier elements being adapted to be coupled with one of the said coaxial relatively rotatable parts after an initial clearance has been taken up, while the other one of the said carrier elements is provided with drive means adapted to couple it in rotation with the other one of the said coaxial parts over at least part of the angular displacement that takes place between the two coaxial parts.

BACKGROUND OF THE INVENTION

Such a device, conforming with the field of the invention as described above, is disclosed for example in U.S. Pat. No. 4,496,036 and the corresponding French published patent application No. FR-A-2 493 446. FIG. 22 of that specification discloses drive means in the form of a recess, by means of which the resilient arm is in engagement with an element which is fixed with respect to one of the rotatable coaxial parts of the device. This arrangement enables a profiled coupling means to be provided and facilitates assembly of the device by simple axial insertion.

In connection with the inner carrier element, the coupling is positive and is achieved by force fitting, for example with the aid of cotter pins. However, this results in additional stresses, which may be prejudicial to the length of the useful life of the damper and also to its mechanical strength.

SUMMARY OF THE INVENTION

An object of the present invention is to overcome these disadvantages in a simple and economic manner, without losing the advantages of assembly by simple axial insertion into one of the rotatable coaxial parts of the damper, while also producing other advantages.

In accordance with the invention, a torsion damper of the kind defined above, in which one of the carrier elements, referred to as the first carrier element, is coupled to one of the said coaxial parts, referred to as the first coaxial part, for rotation therewith after an initial clearance has been taken up, is characterised in that the other one of the said carrier elements, referred to as a second carrier element, is coupled with the other coaxial part, referred to as the second coaxial part, by gripping action, the said second carrier element being subjected to the action of an axially acting resilient means, which is engaged axially on the said second coaxial part and which urges the said second carrier element towards a first radial thrust surface formed on the said second coaxial part, for direct or indirect contact with the said thrust surface.

The invention enables advantage to be taken of a profiled coupling to one of the coaxial parts of the assembly, while also obtaining axial gripping engagement with the other coaxial part but without needing to have recourse to costly manufacturing operations.

This arrangement is particularly relevant in the context of a damped double flywheel, such as is described in French published patent application No. FR-A-2 571 461. The axial coupling can, furthermore, economically be made to form part of a torque limiter, and the invention makes it possible to transmit a high torque while having resilient means which are less stiff than in the prior art.

It will be appreciated that in certain arrangements the axial thrust surface may be made part of one of the two coaxial rotating parts of the double flywheel, such that the reaction plate of the double flywheel can be mounted directly on a bearing which is interposed radially between the reaction plate and a hub which is fixed with respect to the other coaxial part of the flywheel. In addition, the arrangement occupies little space in the axial direction, and in the radial direction it allows the best possible use of the available space.

Advantageously, it is possible, especially in the case where the circumferentially acting resilient means are in the form of springs with spiral arms, to provide abutment means such as to avoid the turns of the spring coming into contact with each other when the torque limiter comes into play. This enables the size of the said spring to be reduced.

The description which follows illustrates the invention, by way of example only, with reference to the accompanying drawings.

DESCRIPTION OF PREFERRED EMBODIMENTS OF THE INVENTION

Figure 1:
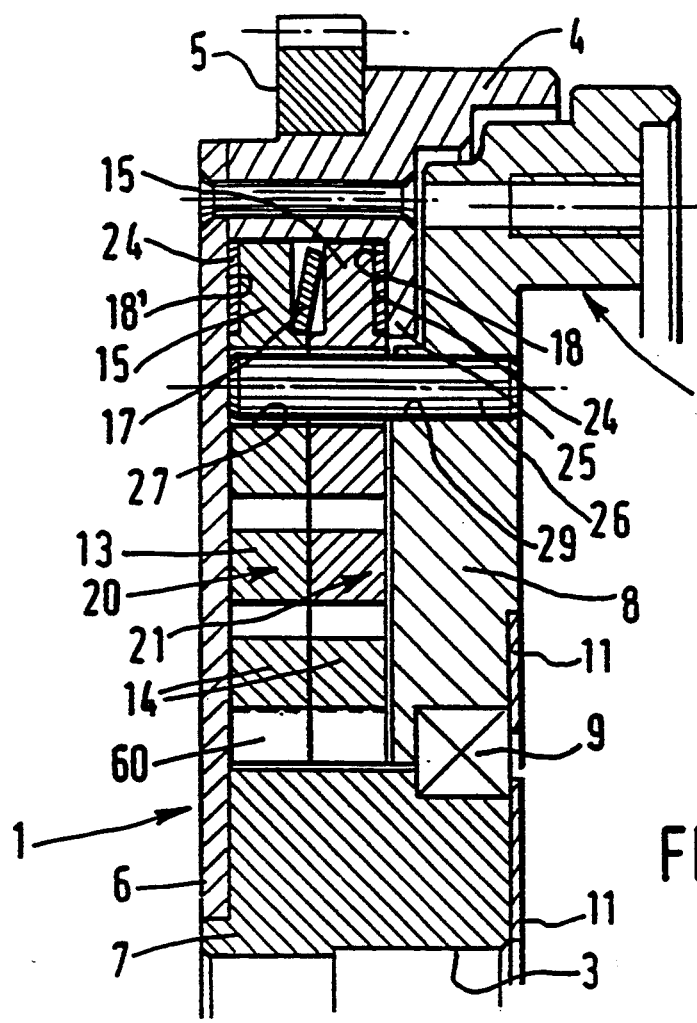
FIG. 1 is a view in axial cross section, on one side of a diametral plane only, and shows a first embodiment of a double flywheel with a torsion damper in accordance with the invention.

Referring to FIG. 1, a double flywheel for an automotive vehicle, incorporating a torsion damper, comprises a first part or input part 1, and a second part or output part 2, of the double flywheel. The input part 1 is adapted to be secured to the engine shaft of an internal combustion engine for rotation therewith. In this example it is fixed to the crankshaft of the engine, and one of a plurality of holes, for bolts (not shown) by which the input part 1 is secured to the crankshaft, is indicated at 3. The input part 1 is provided at its outer periphery with a rotating mass 4 which carries a starter crown 5. An annular face plate 6 connects the rotating mass 4 radially to a central hub 7. The bolt holes 3 are formed in this hub 7, and the face plate 6 is fixed to the hub by means, for example, of countersunk screws (not shown). The rotating mass 4 is in this example secured to the face plate 6 by riveting.

The output part 2 of the flywheel comprises an annular reaction plate 8. The clutch of the vehicle has a friction disc (not shown) which is carried on the reaction plate 8, the friction disc being secured to the input shaft of the gearbox of the vehicle, so as to drive the latter in rotation. The output part 2 is thus secured to the gearbox input shaft, for rotation therewith, through a frictional coupling.

Figure 2:
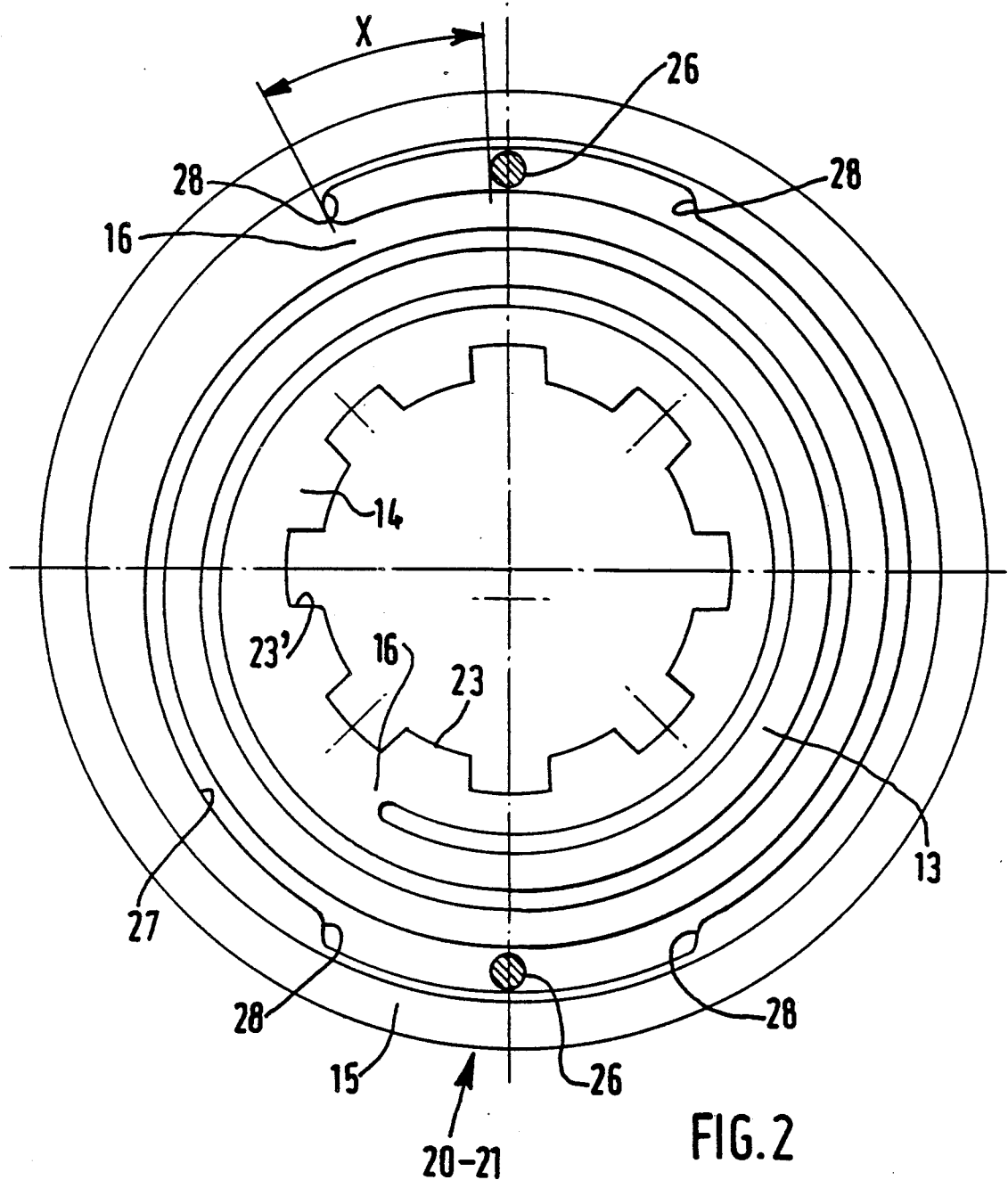
FIG. 2 is a view of the spiral spring, with its displacement limiting stop members sectioned.

The reaction plate 8 surrounds the hub 7, with a bearing 9 interposed radially between them. In this example the bearing 9 is a rolling bearing: it is mounted in a shouldered housing formed in the reaction plate 8 and in the hub 7, and is located axially by means of retaining rings 11 which are secured to the hub 7 and reaction plate 8. The two parts 1 and 2 of the flywheel are coaxial with each other and are mounted for relative rotation of one with respect to the other within the limits of a predetermined angular displacement and against the action of a circumferentially acting resilient means. The latter comprise, in this example, two spiral springs 20 and 21, each comprising a resiliently deformable arm 13 together with two carrier elements 14 and 15, the element 14 being an inner carrier element and the element 15 an outer carrier element. The arm 13 extends between the carrier elements, and is joined integrally with at least one of the latter through a junction zone 16 (FIG. 2). One of the carrier elements 14 or 15, which will here be called a first carrier element, is arranged to be coupled, through a profiled coupling means, with one of the two coaxial parts 1 or 2 of the flywheel for rotation with the latter after an initial circumferential clearance has been taken up.

If the other carrier element 15 or 14 are consequently referred to as the second carrier element then the second carrier element is coupled, by means of a gripping action, with the other of the first and second coaxial parts 1 or 2 and is subjected to the action of an axially acting resilient means 17. The latter is mounted axially on the other of said coaxial parts of the flywheel, and biasses the second carrier element towards a first radial thrust surface 18 formed on the other of said coaxial parts, so that there is direct or indirect contact between the resilient means 17 and the thrust surface 18. In FIG. 1, the gripping means couples the first coaxial part 1 with the second carrier element 15 and the profiled coupling means couples the inner carrier element 14 with the second coaxial part 2.

The arm 13 and its carrier elements 14 and 15 are oriented transversely to the axis of the assembly in this example. In FIG. 1, the above mentioned circumferentially acting resilient means comprises the two spiral springs 20 and 21 which are associated with each other as a pair. These springs are made by pressing in the form of a flat metal plate; they are juxtaposed with each other and the corresponding arms 13 work in parallel. The springs of a pair are preferably disposed in "head to toe" relationship with one of the plates of the pair being reversed through 180 degrees with respect to the other plate of the same pair (i.e. if one arm 13 spirals clockwise inwards as in FIG. 2, the other spirals anti-clockwise), in order to avoid a displacement of the centre of the assembly during operation by reason of the deformation to which the corresponding arms 13 are subjected. These arms 13 are then integral with the inner carrier elements 14 and outer carrier elements 15. In this example, the carrier elements 14 and 15 are annular.

The above mentioned profiled coupling, as shown in FIG. 2, comprises a series of teeth and slots, with teeth 23 of the inner carrier elements 14 of the springs 20 and 21 cooperating with complementary slots of the reaction plate 8 and vice versa. The teeth 23 are arranged alternately with slots 23' in each carrier element 14. For this purpose, the reaction plate 8 has, at its inner periphery, an axially extending flange 60, in which are formed its own teeth and slots which are common to both springs 20 and 21.

Each outer carrier element 15 has a reduced thickness at its outer periphery, in such a way as to form a shoulder and a housing respectively for a thrust or friction ring 24 and for the resilient means 17. This reduction in thickness is asymmetrical, with the carrier element 15 being notched. More precisely, the resilient means 17, which is in the form of a ring, is mounted and interposed between the two outer carrier elements 15, which lie facing each other. In this example, the ring 17 is a Belleville ring, which is operatively engaged axially on the face plate 6 through the outer carrier element 15 of the spring 20, so as to bias the outer carrier element 15 of the spring 21 towards the radial thrust surface 18. The latter is formed on an annular flange 25 which extends radially towards the axis of the assembly and which is formed on the rotating mass 4. The radial width of the flange 25 is generally equal to that of the associated carrier element 15.

Friction rings 24 are interposed against shoulders formed on the outer carrier elements 15, one between the face plate 6 and the spring 20 and the other between the spring 21 and the thrust surface 18. The friction rings 24 are either fixed with respect to the springs 20 and 21, or free.

A second radial thrust surface 18' is defined on the face plate 6 at the same radial level as, and facing towards, the first thrust surface 18. The surface 18' is associated with the spring 20, the Belleville ring 17 being axially engaged indirectly with the thrust surface 18' so as to urge the spring 21 axially towards the thrust surface 18. A torque limiter is thus formed, with the rotating mass 4 acting as an axial spacer between the two thrust surfaces 18 and 18', these latter being parallel to each other.

The force exerted by the Belleville ring 17 is predetermined in the manner described in the above mentioned French published patent application No. 2 571 461, in order to allow sliding to take place at a torque greater than the maximum engine torque. This happens particularly during starting and stopping of the engine, at which times the system passes through the resonant frequency. The stiffness of the ring 17 is so calculated that, with reference to this particular example, the friction torque due to the friction rings 24 will be close to the said maximum torque, though being preferably greater than the latter.

In order to minimise the size of the springs 20 and 21, and to avoid the occurrence of contact between adjacent turns of the respective springs, stop means 26 are provided to limit the angular displacement and biassing action of the springs 20 and 21. In this example these stop means 26 comprise two pins, arranged generally diametrically opposite to each other on each spring, as seen in FIG. 2. The pins 26 extend axially through the springs 20 and 21 via slots 27, which are provided in the latter and which are defined by their arms 13. For accommodating the stop pins 26, the slots 27 are widened in the vicinity of the outer carrier element 15, so as to define a shoulder 28 at each end of the widened portion. One of the shoulders 28 is closed and is semicircular in shape. It delimits the junction zone 16 joining the arm 13 of the spring to its carrier element 15. The stop pins 26 are fixed part of the coaxial part 2 of the flywheel, being force fitted in holes 29 formed in the reaction plate 8. Thus in the case of an overtorque, the angular displacement between each inner carrier element 14 and the associated outer carrier element 15 is limited due to the cooperation between the pins 26 and the shoulders 28 of the spring concerned.

During normal running, the torque limiter does not act. Instead the arms 13 of the springs are operational, with the outer carrier elements 15 (which are fixed with respect to the thrust surfaces 18 and 18') being displaced circumferentially with respect to the inner carrier elements 14 until the pins 26 come into contact with two of the appropriate shoulders 28 of each spring. The shoulders 28 are suitably arranged for this purpose in accordance with the particular direction of relative displacement.

However, if the relative movement between the outer and inner carrier elements continues, for example in the case of an excessive torque occurring, the torque limiter and the friction rings 24 come into operation, and a relative angular displacement of the outer carrier elements 15 with respect to the thrust surfaces 18 and 18' then takes place. The springs 20 and 21 then remain wound in the state in which they are to be found when the stop pins 26 come into cooperation with the shoulders 28.

Figure 3:
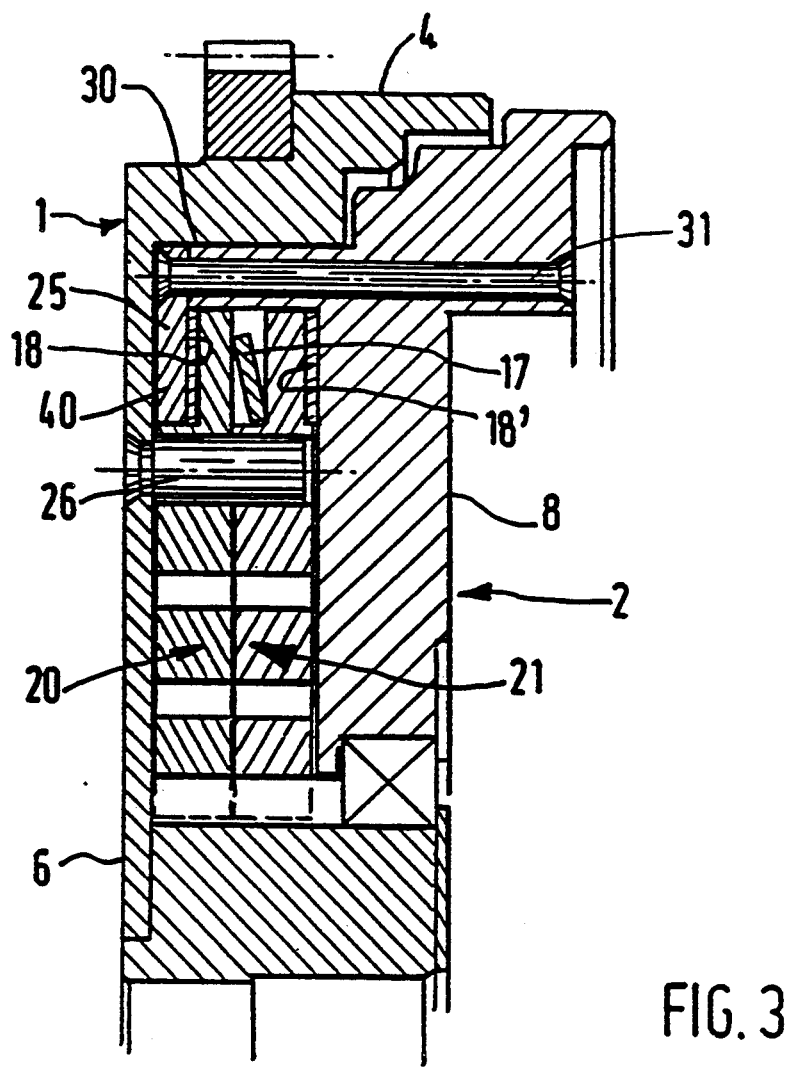

With reference now to FIG. 3, the pins 26 may be secured as shown, for example by riveting, to the face plate 6, with the latter being integral with the rotating mass 4. In that case, the thrust surfaces 18 and 18' form part of the coaxial flywheel part 2, while the thrust surface 18 is formed on a ring 40 which is secured by riveting to an annular crown 30. The crown 30 is oriented axially so as to project from the reaction plate 8, with which it is integrally moulded. The second thrust surface 18' is formed directly on the reaction plate 8. The securing rivets for the ring 40 are indicated at 31.

Figure 4:
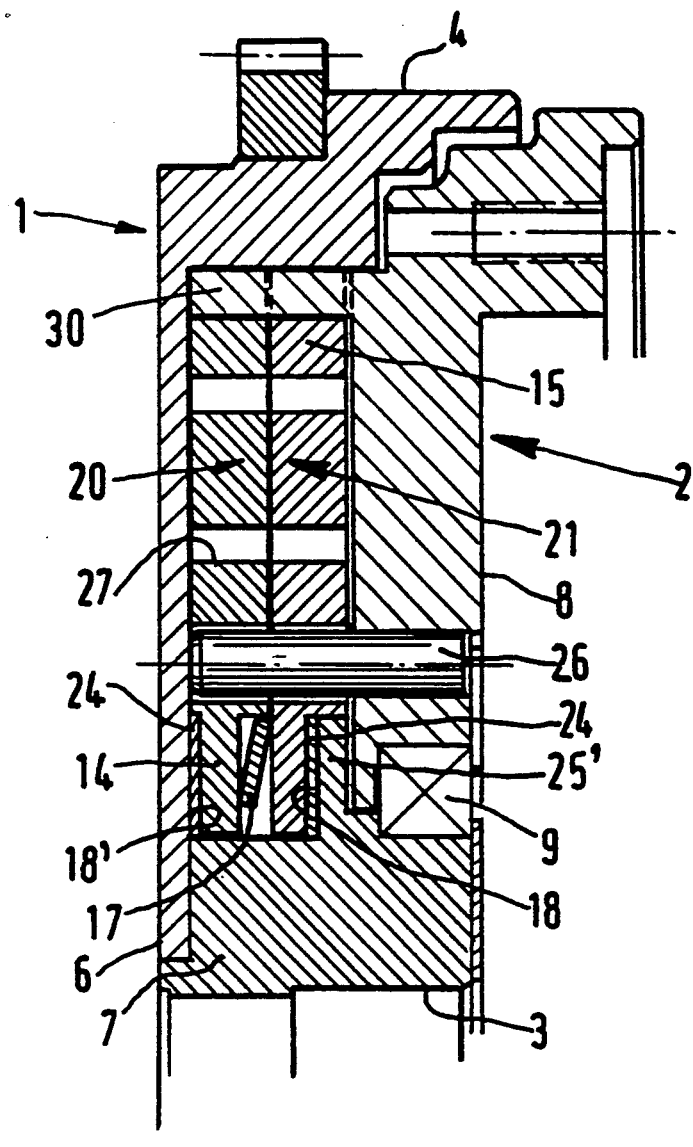

With reference now to FIG. 4, the outer carrier element 15 may be coupled with the coaxial flywheel part 2, for rotation therewith, through the cooperation of profiled teeth and slots. The reaction plate 8 here includes an axial crown 30 in the vicinity of the rotating mass 4, with the latter forming a single member with the face plate 6. The crown 30 has teeth and slots alternating with each other. The torque limiter is arranged at the level of the inner carrier elements 14, as are the widened portions of the slots 27 which define the shoulders 28.

One of the thrust surfaces, 18', is formed at the inner periphery of the face plate 6, while the other thrust surface 18 is formed on the hub 7, on a radial flange 25' of the latter which extends radially outwards with respect to the axis of the assembly. The stop pins 26 are fixed to the reaction plate 8. The inner carrier elements 14 are thinner than the outer carrier elements 15. The spring ring 17 is mounted in a notch or slot which is formed in the inner carrier element 14 of the spring 20, while the flange 25' is mounted in a notch or slot formed in the inner carrier element 14 of the spring 21.

Figure 5:
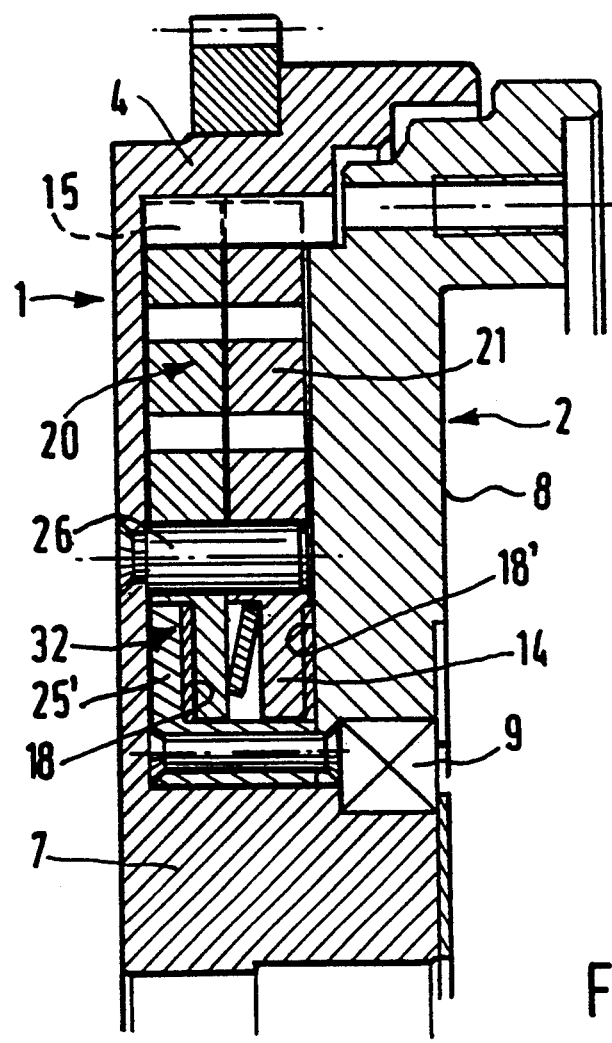

Reference is now made to FIG. 5, in which the structure is shown reversed. In this case the torque limiter is part of the output part 2 of the flywheel, and the stop pins 26 are part of its input part 1. It is here necessary to provide a connecting plate 32, forming an axial spacer between the thrust surfaces 18 and 18' and having a flange 25', which is directed away from the axis of the assembly and which is fixed by riveting to the reaction plate 8, on the inner periphery of which the second thrust surface 18' is formed. The rotating mass 4 then has driving teeth and is formed integrally with the hub 7 and face plate 6.

As will be evident from this description and from the drawings, the friction pads 24 also act as spacers, in such a way that any contact is prevented between the two springs 20, 21, the reaction plate 8 and the face plate 6. In addition, no friction takes place between the springs 20 and 21, having regard to the mounting clearances and the action of the spring ring 17.

In every case, the appropriate carrier elements are inserted between two annular, radial surfaces in register with a similar member, and it is possible to form a sub assembly with these surfaces. Such a sub assembly can subsequently be fitted in position by simple axial insertion.

It will also be noted that in FIGS. 3 to 5 it is possible to test the first coaxial flywheel part.

In addition, it is possible easily to lubricate the springs, since the latter are enclosed inside a cavity which is delimited by the face plate 6, the reaction plate 8, and the hub 7. This cavity can easily be made fluid tight, by using a rotating seal and by employing for the bearing 9 a bearing of the sealing type.

Beyond this, the present invention is not limited to the embodiments described herein. In particular, the torsion damper may be part of a friction clutch, in which case for example, the reaction plate 8 is of reduced thickness, as is the rotating mass 4, with the reaction plate carrying a friction disc while the hub 7 is splined for mounting on a driven shaft for rotation with the latter.

The rotational couplings between a carrier element and the appropriate coaxial part of the double flywheel may take the form of splined couplings.

Figure 6:
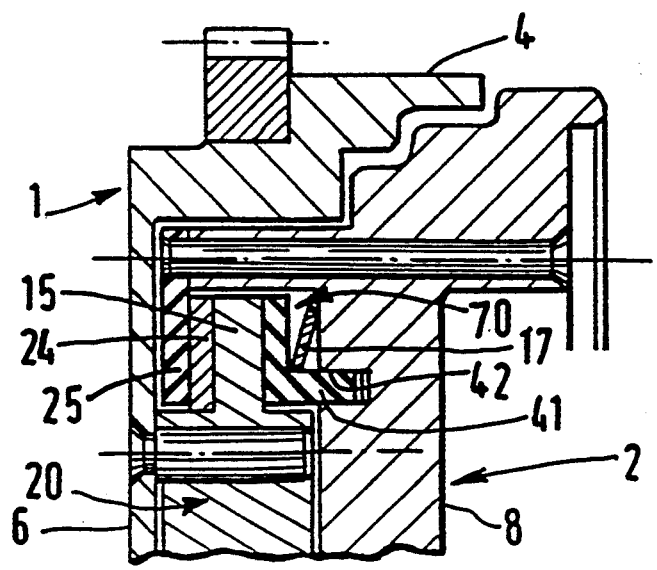
FIGS. 3 to 6 are views similar to FIG. 1, but show, respectively, further embodiments of the invention.

Only a single spiral spring may be provided if desired. In that case, the appropriate carrier element has, on one of its faces, a friction pad for contact with the thrust surface, and is in contact through its other face with a thrust ring which is connected in rotation to the appropriate coaxial part of the double flywheel. Such an arrangement is shown in FIG. 6, in which the resilient element 17 bears directly on the other thrust surface so as to urge the thrust ring towards the above mentioned thrust surface and to grip the carrier element 15. FIG. 6 is similar to FIG. 3, the thrust ring being indicated at 70 and having fingers 41 engaged in holes 42 formed in the reaction plate 8.

The resilient element may comprise an Onduflex ring, or a pair of Belleville rings mounted back to back, one over the other.

A dry friction arrangement can readily be provided. For example, and with reference to FIG. 1, this may be achieved in the manner described in French published patent application No. 2 571 461, by using a thrust ring carrying a friction ring, with the thrust ring being coupled to the face plate 6, for rotation therewith, through axial lugs or fingers engaged in openings formed in the face plate. A Belleville ring bears on the face plate so as to urge the thrust ring against the ends of the teeth of the flange 60.

Figure 7:
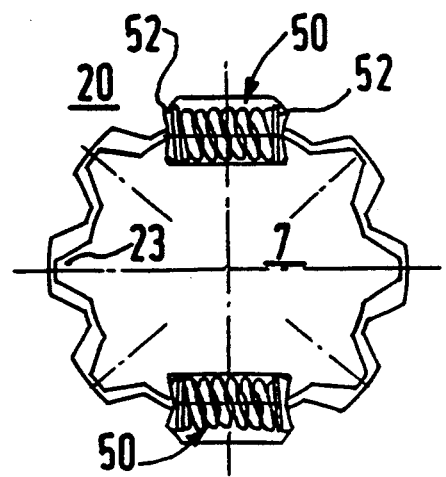
FIG. 7 is a diagrammatic partial front view showing a modification in which resilient means of low stiffness are provided.

Similarly, the rotational coupling by means of cooperating profiled elements may be arranged to have an initial clearance. It is also possible to insert resilient means of low stiffness, to control the relative rotational movement while this clearance is being absorbed. The associated teeth and slots are trapezoidal in form as shown in FIG. 7. The low stiffness resilient means, which are indicated at 50 in FIG. 7, are coil springs which are mounted in slots formed in the spiral springs 20 and 21 and in the hub 7. Thrust inserts 52 are interposed between the ends of the springs 50 and the ends of these slots, and the springs 50 are diametrically opposed to each other.

There may be more than two spiral springs 20, 21. For example, two pairs of flat resilient plates may be provided, one of these pairs being surrounded by the plates of the other pair and being offset angularly with respect to the said other pair, in the manner described in French published patent application No. 2 631 091 filed on May 6, 1988.

One of the carrier elements may be discontinuous, and may be formed of more than one member.

The springs performing the function of the spiral springs 20 and 21 may have a resiliently deformable arm which has the shape shown in FIG. 22 of the above mentioned French published patent application No. FR-A-2 493 446. The outer carrier element is then provided with a suitable recess for cooperation with a projection of the appropriate coaxial part of the flywheel, to define the profiled coupling.

Each spiral spring 20 or 21 may have at least one pair of resiliently deformable arms, in the manner described in U.S. Pat. No. 4,795,012.

Instead of being made of metal, the spiral springs may be of fibre reinforced synthetic material. In that case, the presence of the friction rings 24 is not necessarily required, as these can be incorporated in the carrier element concerned, the latter having a thickened portion for this purpose. By contrast with the embodiments shown in FIGS. 1 to 6, this carrier element is then asymmetrical, with a thickened portion on one side for contact with the associated thrust surface, and on the other side a notch for engagement of the spring ring 17 therein.

What is claimed is:

1. A torsion damping device comprising at least a first and a second coaxial part; means mounting said coaxial parts for rotation of either relative to the other; means defining a predetermined range of displacement of said relative rotation; and circumferentially acting resilient means, interposed between said coaxial parts for opposing said relative rotation and comprising at least one spring member having an outer carrier element, an inner carrier element, a resiliently deformable arm, and a junction zone joining the arm to at least one of the carrier elements, the arm being connected between the outer and the inner carrier elements, the device further comprising: a profiled coupling means rotatably coupling one of said first and second coaxial parts with one of said inner and outer carrier elements of each said spring member and defining an initial circumferential clearance between them; gripping means between the other of said first and second coaxial parts and the other of said inner and outer carrier elements of each said spring member for coupling the other of said first and second coaxial parts to the other of said inner and outer carrier elements, a first radial thrust surface defined on the other of said first and second coaxial parts, a second radial thrust surface being defined on the other of said first and second coaxial parts, and axially acting resilient means bearing axially on the second radial thrust surface to urge the other of said inner and outer carrier elements of each said spring member toward said first radial thrust surface for frictional engagement therewith, said second radial thrust surface being axially in line with said first radial thrust surface, and said other of said inner and outer carrier elements being of reduced thickness as compared with said arm of the circumferentially acting resilient means for housing said axially acting resilient means.

2. A torsion damping device according to claim 1, wherein said other of said inner and outer carrier elements being of asymmetrical reduction in thickness to form a shoulder and a housing for a friction ring interposed and acting between said second radial thrust surface and said other of said inner and outer carrier elements.

3. A torsion damping device according to claim 1, wherein said circumferentially acting resilient means comprise two said spring members in juxtaposition with each other and the others of said inner and outer carrier elements defining a recess, said axially acting element being engaged in said recess.

4. A torsion damping device, comprising:
first and second coaxial parts;
means for mounting the coaxial parts for rotation of either relative to the other;
circumferentially acting resilient means interposed between the coaxial parts for opposing the relative rotation, wherein the circumferentially acting resilient means comprises at least one spring member having an annular outer carrier element, an annular inner carrier element, and a resiliently deformable arm connecting between the annular outer carrier element and the annular inner carrier element;
wherein the device further comprises:
profiled coupling means rotatably coupling one of the coaxial parts with one of the annular inner and outer carrier elements after an initial circumferential clearance has been taken up, the profiled coupling means comprising a series of slots provided in the one of the annular inner and outer carrier elements and a corresponding series of teeth provided on the one of the coaxial parts, wherein the series of teeth in the one of the coaxial parts are received, with circumferential clearance, in the series of slots provided in the one of the annular inner and outer carrier elements, and wherein low stiffness resilient means are interposed between the one of the coaxial parts and the one of the annular inner and outer carrier elements for controlling relative rotational movement between the one of the coaxial parts and the one of the annular inner and outer carrier elements while the circumferential clearance is being taken up;
gripping means for frictionally coupling the other of the coaxial parts and the other of the annular inner and outer carrier elements, wherein the other of the annular inner and outer carrier elements is interposed between two radial thrust surfaces provided on the other of the coaxial parts, and wherein the gripping means comprises: axially acting resilient means interposed between the two radial thrust flanges and urging the other of the annular inner and outer carrier elements towards a first one of the two thrust surfaces.

5. A device as recited in claim 4, wherein the other of the annular inner and outer carrier elements defines a reduced axial thickness as compared with the resiliently deformable arm.

6. A device as recited in claim 4, wherein the other of the annular inner and outer carrier elements includes a reduced thickness portion and a shoulder for accommodating a friction ring which bears against the first one of the two thrust surfaces.

7. A device as recited in claim 4, wherein the circumferentially acting resilient means comprises two said spring members, and wherein a recess is formed in the other of the annular inner and outer carrier elements of at least one of the spring members, and wherein the axially acting resilient means is disposed in the recess.

8. A device as recited in claim 7, wherein the other of the annular inner and outer carrier elements of at least one of the spring members includes a shoulder which accommodates a friction ring that bears against the first one of the two thrust surfaces.

* * * * *